(No Model.)
V. R. VON OFENHEIM & R. R. VON HAIDINGER.
Process of and Apparatus for Bleaching and Purifying Liquid Bituminous Matters.
No. 242,171.      Patented May 31, 1881.
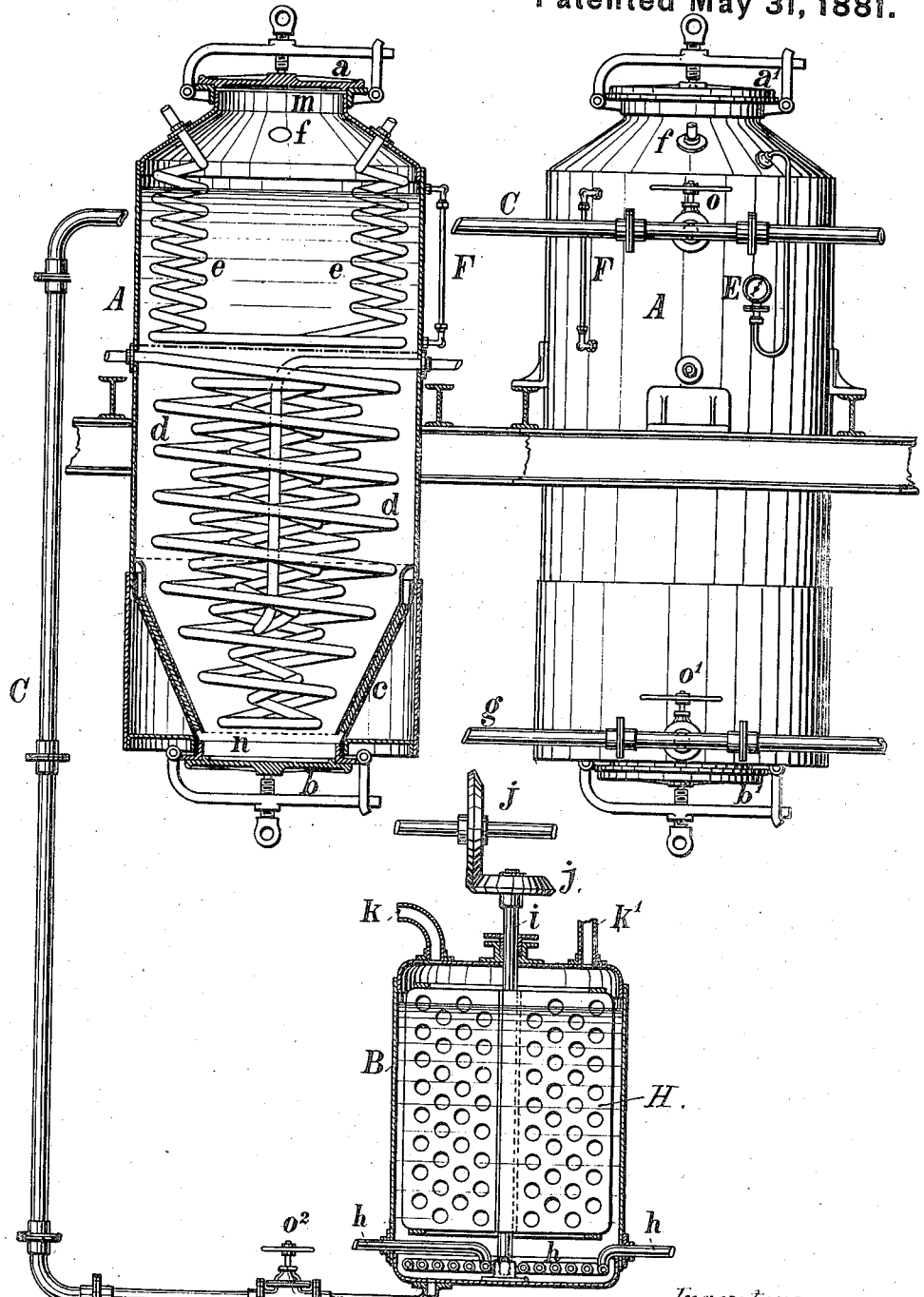
Witnesses:
Penn. Halsted
Geo. R. Byington.
Inventors:
Victor Ritter von Ofenheim
Rudolf Ritter von Haidinger
by John J. Halsted
Atty.

# UNITED STATES PATENT OFFICE.

VICTOR RITTER VON OFENHEIM AND RUDOLF RITTER VON HAIDINGER, OF VIENNA, AUSTRIA-HUNGARY.

PROCESS OF AND APPARATUS FOR BLEACHING AND PURIFYING LIQUID BITUMINOUS MATTERS.

SPECIFICATION forming part of Letters Patent No. 242,171, dated May 31, 1881.

Application filed June 25, 1880. (No model.) Patented in England August 22, 1879, in Italy September 30, 1879, in France November 8, 1879, and in Germany April 14, 1880.

*To all whom it may concern:*

Be it known that we, VICTOR RITTER VON OFENHEIM and RUDOLF RITTER VON HAIDINGER, both of Vienna, Austria-Hungary, have invented Improvements in an Apparatus for Bleaching and Purifying Ozocerite, Paraffine, Petroleum, Stearine, Glycerine, and other like Bituminous Fats or Matters, of which the following is a specification.

Our invention chiefly consists of an improved process of bleaching and purifying the above-named matters or fats, whether solid or liquid, by employing hydrates of alumina, hydrates of oxides of iron and manganese, hydrates of magnesia, and all kinds of silicates of alumina and magnesia or other analogous absorbent earths in a state of fine comminution or porosity; and in an apparatus appropriate thereto and invented by us for the purpose; and we do hereby declare that the following is a full, clear, and exact description of the invention, which, by the aid of the accompanying drawings, will enable others skilled in the art to which it appertains to make and use the same. The said process is founded on the discoloring effect of hydrates and silicates of alumina and magnesia and of hydrates of oxides of iron and manganese, through which, while being inclosed in a filtering apparatus, the bituminous matter or fat to be bleached or purified is caused to pass, and this may be effected either by propulsion or exhaustion. Bituminous matters or fats, which at ordinary temperatures are in a concrete state, such as ozocerite, paraffine, &c., must beforehand be molten or dissolved in benzine, sulphuric ether, sulphuret of carbon, or any other of the well-known solvents, preparatory to submitting them to our bleaching process. Such paraffines, which are found in a natural state in ozocerite or paraffines obtained in an artificial way by distillation or paraffines contained in paraffine-oils, are at first submitted to distillation, which, at a temperature of about 200° Celsius, is continued as long as distillation can be observed. To hasten the operation artificial as well as natural paraffines may beforehand be submitted to a pressure, by means of hydraulic presses. For the same reason steam of about 200° Celsius may be caused to pass over the heated mass to hasten the distillation of the heavy oils.

The accompanying drawing represents our apparatus in longitudinal elevation, partly in section. It consists of one, two, or more suitable vessels, A A, constructed of iron or other substantial material, and provided at the top and bottom with lids $a\ a'\ b\ b'$. The lower part of each vessel contains a filter, $c$, made of perforated plates of any suitable material, these perforations or holes being covered by felt or other appropriate material, which may be protected by wire-gauze. Each vessel further contains a coiled pipe, $d$, and another coiled pipe, $e$, into both of which pipes hot steam or hot air may be allowed to enter. For use these vessels are filled through the top at $m$ up to the upper end of the coiled pipe $d$ with one of the above-named bleaching materials, or with a mixture of them, in a state of fine comminution or porosity. The liquid bituminous matter or fat is then fed through the aperture $f$ or $m$, and the vessels are closed by the lids $a\ a'$. Hot steam is then caused to enter the coiled pipe $e\ e$, the steam being of such a temperature as is necessary to make the fat or bituminous matter boil. The vapors generated by the boiling exert a pressure upon the liquid, so that this latter will be forced through the bleaching material and through the filter, and it is then collected into suitable vessels or barrels.

Bituminous matter or fat, which at ordinary temperature is not liquid, and which therefore should, as a preparatory step, be brought into a liquid state, may be first put into the dissolving apparatus B, which consists of a vessel of suitable form and material, preferably a cylindrical iron vessel, provided with a coiled pipe, $h$, and a perforated stirring-plate, H, fixed on a vertical spindle, $i$, which, by means of the gear-wheels $j j$, may be set in rotation. The vessel B has at its top two pipes, $k\ k'$, or apertures, through which the concrete bituminous matter or fat to be dissolved and also the solvent may be supplied. After the vessel is filled steam or hot air is allowed to enter into the coiled pipe $h$, and the stirring-plate H is rotated so as to mix the raw material and the solvent well together. After this has been done the whole contents of vessel B may be collected into any suitable vessel, or they may be forced through a pipe, $c$, directly into the filtering-vessels A A, and this may be effected either by propulsion or exhaustion, and they are there filtered in the same manner as hereinabove described and then submitted to distillation in an alembic to separate the solvent from the bituminous matter or fat.

After the filtering material shall have lost its filtering power, or a part of it, it is revivified or renovated by letting hot steam pass through coiled pipe $d$, while the vapors generated are allowed to issue through opening $f$. If a solvent has been employed the filtering material is beforehand washed with the same solvent until all bituminous matter or fat is washed off from the filter.

Very volatile bituminous matter or fat may be renovated or revivified in the filtering-vessel by steam of suitable temperature allowed to pass through coiled pipe $d$. Less volatile bituminous matter or fat, however, should, after being dried by the drying-pipe $d$, be removed through the aperture $n$ and subjected to a strong heat in a suitable renovating apparatus, while fresh filtering or bleaching material may be filled into the vessel through the top or opening $m$.

If small quantities are to be bleached the filtering apparatus may be so arranged that the whole filter—that is, the lower part of the vessel A—may be removed and submitted to the action of heat until the bleaching material is renovated.

E is a pressure-gage. $o$ $o'$ $o^2$ are cocks. F F are water-gages.

When the fats are in a solid or concrete state they may, as hereinbefore stated, be first reduced to a liquid state by any proper means—such, for instance, as the apparatus shown in the lower part of the drawings and hereinbefore described. We reserve, however, any claim for this specific apparatus for a future application.

We claim—

1. The described process of bleaching and purifying liquid bituminous matters or fats by forcing the same, when highly heated, within a closed vessel through one or more of the uncrystallized hydrates of alumina, magnesia, manganese, or iron, or silicates of alumina, magnesia, or other analogous absorbent earths in a state of fine comminution or porosity, substantially in the manner set forth.

2. In an apparatus for bleaching and purifying bituminous matters or fats, the combination, with and within the same closed vessel A, of the steam-pipes $d$ and $e$, placed one above the other, and of the filtering device, substantially as and for the purposes described.

VICTOR RITTER v. OFENHEIM.
RUDOLF RITTER v. HAIDINGER.

Witnesses:
HENRY PALM,
VERNER S. TINGLEY,
ELIGIUS MICHALECKI,
VICTOR KARMIG.